United States Patent
Eckert et al.

(10) Patent No.: US 9,222,635 B2
(45) Date of Patent: Dec. 29, 2015

(54) DEVICE FOR FASTENING A LAMP OF A MOTOR VEHICLE TO ITS BODY

(71) Applicant: GM GLOBAL TECHNOLOGY OPERATIONS LLC, Detroit, MI (US)

(72) Inventors: Heiko Eckert, Bingen-Büdesheim (DE); Peter Oberkoxholt, Mainz (DE); Thomas Feid, Mannheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/777,143

(22) Filed: Feb. 26, 2013

(65) Prior Publication Data

US 2013/0235603 A1    Sep. 12, 2013

(30) Foreign Application Priority Data

Mar. 8, 2012    (DE) .......................... 10 2012 004 748

(51) Int. Cl.
| | | |
|---|---|---|
| B60Q 1/00 | (2006.01) | |
| B60Q 3/00 | (2006.01) | |
| B60Q 11/00 | (2006.01) | |
| F21S 8/10 | (2006.01) | |
| B60Q 1/26 | (2006.01) | |

(52) U.S. Cl.
CPC *F21S 48/00* (2013.01); *B60Q 1/263* (2013.01)

(58) Field of Classification Search
CPC .............. F21S 48/00–48/1122; F21S 48/1305; B60Q 1/0408; B60Q 1/0425; B60Q 1/0441; B60Q 1/0483; B60Q 1/2619; B60Q 1/263; B60Q 1/2638; B60Q 1/2642
USPC ......... 362/487, 421, 420, 528, 459, 507, 523, 362/546, 548, 549
See application file for complete search history.

(56) References Cited

U.S. PATENT DOCUMENTS

| | | | |
|---|---|---|---|
| 4,188,655 A | | 2/1980 | Tallon et al. |
| 4,843,523 A | | 6/1989 | Nakamura |
| 5,045,987 A | * | 9/1991 | Hebert .......................... 362/421 |
| 5,077,642 A | * | 12/1991 | Lisak ............................. 362/463 |
| 5,269,640 A | | 12/1993 | Jonishi et al. |
| 6,299,335 B1 | | 10/2001 | Shirai et al. |
| 6,550,947 B1 | * | 4/2003 | Kibayashi ...................... 362/515 |
| 7,341,364 B2 | * | 3/2008 | Yamaguchi et al. .......... 362/473 |
| 2002/0080620 A1 | | 6/2002 | Christiansen |
| 2006/0000959 A1 | | 1/2006 | Hansen |
| 2011/0128723 A1 | * | 6/2011 | Coleman et al. .............. 362/183 |
| 2012/0294028 A1 | * | 11/2012 | Wainscott et al. ............ 362/528 |

FOREIGN PATENT DOCUMENTS

| | | |
|---|---|---|
| DE | 10045828 A1 | 4/2002 |
| DE | 102008059294 A1 | 6/2010 |
| EP | 0878354 A2 | 11/1998 |
| FR | 2298059 A1 | 8/1976 |
| FR | 2463311 A1 | 2/1981 |
| GB | 1314034 A | 4/1973 |

OTHER PUBLICATIONS

German Patent Office, German Search Report for Application No. 10 2012 004 748.7, dated Oct. 18, 2012.

* cited by examiner

*Primary Examiner* — Jason Moon Han
(74) *Attorney, Agent, or Firm* — Ingrassia Fisher & Lorenz PC (57) ABSTRACT

A device for fastening a lamp of a motor vehicle to its body is provided. The device includes a receiving part having a ball socket and a ball pin. The ball pin is pivotably received in the ball socket of the receiving part and the ball pin is configured as a part of the lamp or as a separate component on the lamp. A lamp having the device is also provided.

19 Claims, 6 Drawing Sheets

DEVICE FOR FASTENING A LAMP OF A MOTOR VEHICLE TO ITS BODY

CROSS-REFERENCE TO RELATED APPLICATION

This application claims priority to German Patent Application No. 10 2012 004 748.7, filed Mar. 8, 2012, which is incorporated herein by reference in its entirety.

TECHNICAL FIELD

The technical field relates to a device for fastening a lamp of a motor vehicle to its body. Furthermore, the technical field relates to a lamp of a motor vehicle.

BACKGROUND

Certain devices serve for fastening lamps, in particular tail lamps, to the body of motor vehicles. With respect to their design configuration, the devices are usually adapted to the respective shape of the bodies associated with them. By doing so it is to be ensured that a lamp is optimally oriented relative to the body, following its contours in the desired manner.

Through the variety of the body shapes that can be produced, the individual production of the devices is relatively involved and thus cost-intensive. Added to this is an additional logistical effort as a cost factor.

It is therefore desirable to provide a device of the type mentioned at the outset, which, compared with the previous devices, can be produced with less effort and thus more cost-effectively. Furthermore, a lamp is to be provided that can be suitably arranged in different bodies without problems and aligned with the body.

SUMMARY

A device for fastening a lamp of a motor vehicle to its body according to an exemplary embodiment comprises a receiving part and a ball pin. The ball pin is pivotably received in a ball socket of the receiving part and the ball pin is configured as part of a lamp or as a separate component on a lamp.

Through the pivotability of the ball pin in the receiving part, a position tolerance between the ball pin and the receiving part is achieved, so that a lamp equipped with one or a plurality of ball pins can be mounted to the respective associated receiving part without a problem, even if the respective receiving part on the body slightly varies in its position depending on the configuration of the body. Such a position tolerance can be easily offset by the device contemplated herein.

In an embodiment, the device allows stating a variable fastening system, which satisfies the high demands for the correct orientation of lamps relative to a body.

In particular, tail lamps can be mounted on and aligned with a motor vehicle without problem. The use of a ball pin in a receiving part leads to a ball joint-like design, as a result of which the ball pin can be pivoted within a predeterminable angular range.

Through the pivoting of the ball pin, the lamp connected with the ball pin can be optimally aligned with a multiplicity of body shapes as desired.

According to an exemplary embodiment, the ball pin is pivotable in more than one plane. Because of this, the device forms a ball joint through which a lamp can be spatially pivoted within a defined taper angle.

According to another embodiment, the receiving part comprises a tubular portion on the first longitudinal end of which the ball socket is formed and on the second longitudinal end of which a circumferential collar is formed. Through the embodiment of a tubular portion, the length of which can be variably selected, the ball socket is completely or partially received within the body. The tubular portion leads the ball socket completely or partially into the interior of the body. Here, the collar can lie flat against the outer wall of the body and stabilize the position of the device.

According to a further embodiment, the circumferential collar comprises a bearing surface for a seal or for a sealing lip for bearing against the body, which is inclined against the longitudinal axis of the tubular portion. Because of this, the collar can be placed against body portions that are inclined relative to the travelling plane, wherein the tubular portion is substantially held in horizontal position.

According to a further embodiment, on the circumferential collar at least one seal or one sealing lip for bearing against the body is arranged. Because of this, the receiving part can seal against the body in such a manner that the entry of water into the interior of the body is avoided. One or more than one sealing lips can be designed unitarily with the collar in order to facilitate their production.

Before this background it is conceivable that on the collar a single circumferential sealing lip is formed. Because of this, gaps and edges between individual sealing lips are avoided.

It is also conceivable that between the bearing surface of the collar and the body a seal, in particular a cellular rubber, is arranged. Because of this, gaps and tolerances can be offset.

According to an embodiment, in at least two walls of the tubular portion indentations pronounced towards the inside are formed. Because of this, a spherical portion, which is formed at an end of the ball pin, can be engaged over by the indentations and held in the ball socket. The indentations prevent that the ball pin can be moved alongside its longitudinal axis and slip out of the ball socket.

Furthermore, it is advantageously realized through the indentations that the ball pin can be clipped or pressed into the ball socket in the direction of its longitudinal axis.

Before this background it is conceivable that more than two indentations are provided in order to engage over the spherical portion of the ball pin.

According to another embodiment, on the receiving part at least one engagement means is arranged, through which the receiving part can be fixed on the body. Through the engagement means, the receiving part can be fixed in a predetermined position without problem, for example on a rim of an opening on the body, in particular clipped into an opening in the body.

Engagement means can be configured as lugs with undercuts, wherein the rim of the opening of the body is received between a support surface of the lugs and the bearing surface of the collar.

It is opportune that the receiving part comprises at least one material portion through which portion a rim of a through-opening in the body can be at least partially engaged about in order to bring the receiving part into a fixing position relative to the through-opening.

According to a further embodiment, the receiving part is produced from plastic. A plastic has a low weight and can be processed through injection molding without problems. Thus, a receiving part can be produced in a multiplicity of geometrical configurations without problem.

According to an embodiment, the receiving part has a sack-like interior from which the ball pin protrudes through an insertion opening, wherein the insertion opening is formed on the side of the receiving part facing away from the ball socket. Because of this, the lamp, in particular a tail lamp, can be connected to the ball pin, wherein the ball pin is already arranged in the receiving part.

According to another embodiment, the ball pin has a rod-like portion which is set apart from a spherical portion through a constriction. Indentations can engage in the constriction, engage over the spherical portion and fix the ball pin within the receiving part.

A lamp for a motor vehicle is also contemplated herein. The lamp is connected with a device of the type described above through the ball pin, wherein the ball pin is designed as a part of the lamp or as a separate component on the lamp.

Such a lamp can be oriented in a technically simple manner and thus cost-effectively relative to a multiplicity of bodies, in that the ball pin is merely pivoted within the receiving part.

According to a further embodiment, the lamp is configured as a tail lamp. Because of its pivotability, such a tail lamp can exactly follow the structures of the body and can be mounted in longitudinal direction of the motor vehicle without problem.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
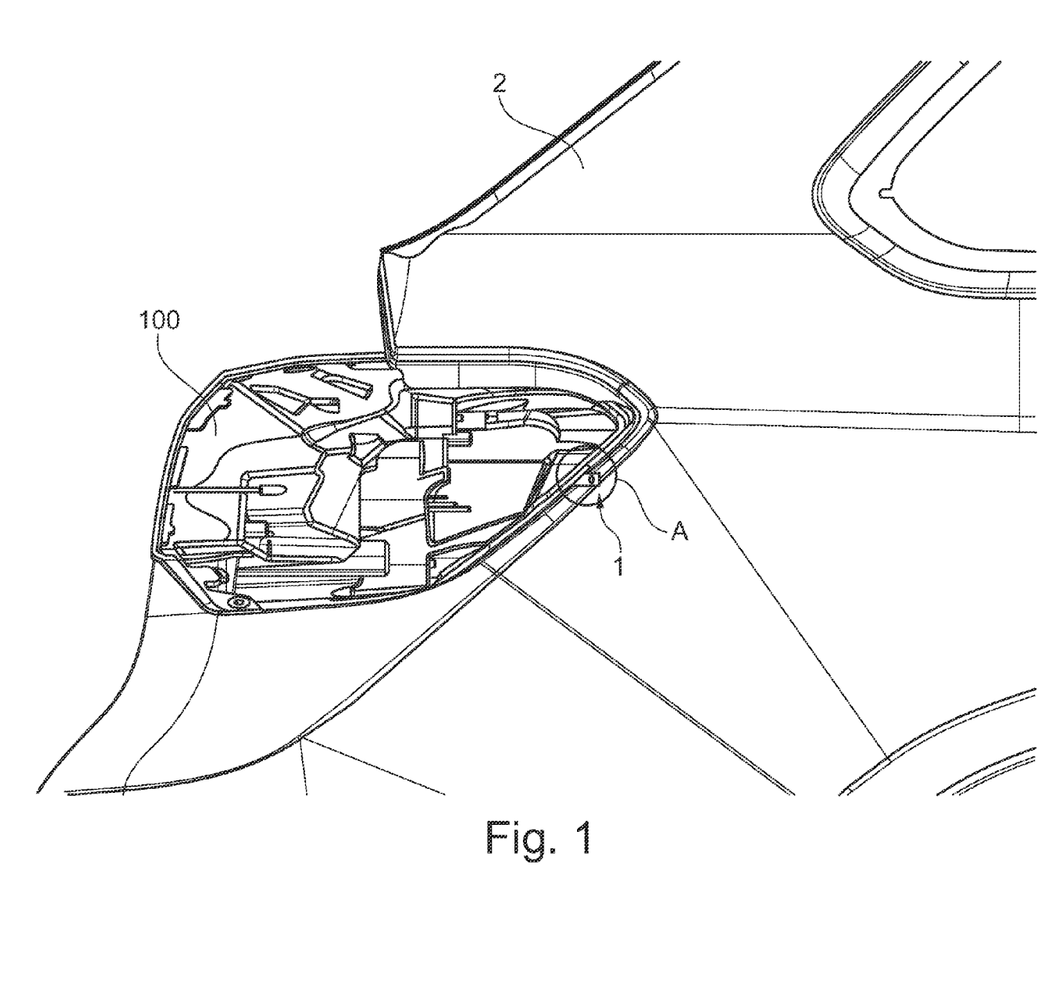
FIG. 1 is a side view of a body of a motor vehicle having a tail lamp in part section, wherein the tail lamp is fixed to the body by a device according to an exemplary embodiment.

FIG. 1 shows—in schematic representation—the body 2 of a motor vehicle in the tail region, wherein on the body 2 a lamp 100, in particular a tail lamp, is mounted.

Figure 2:
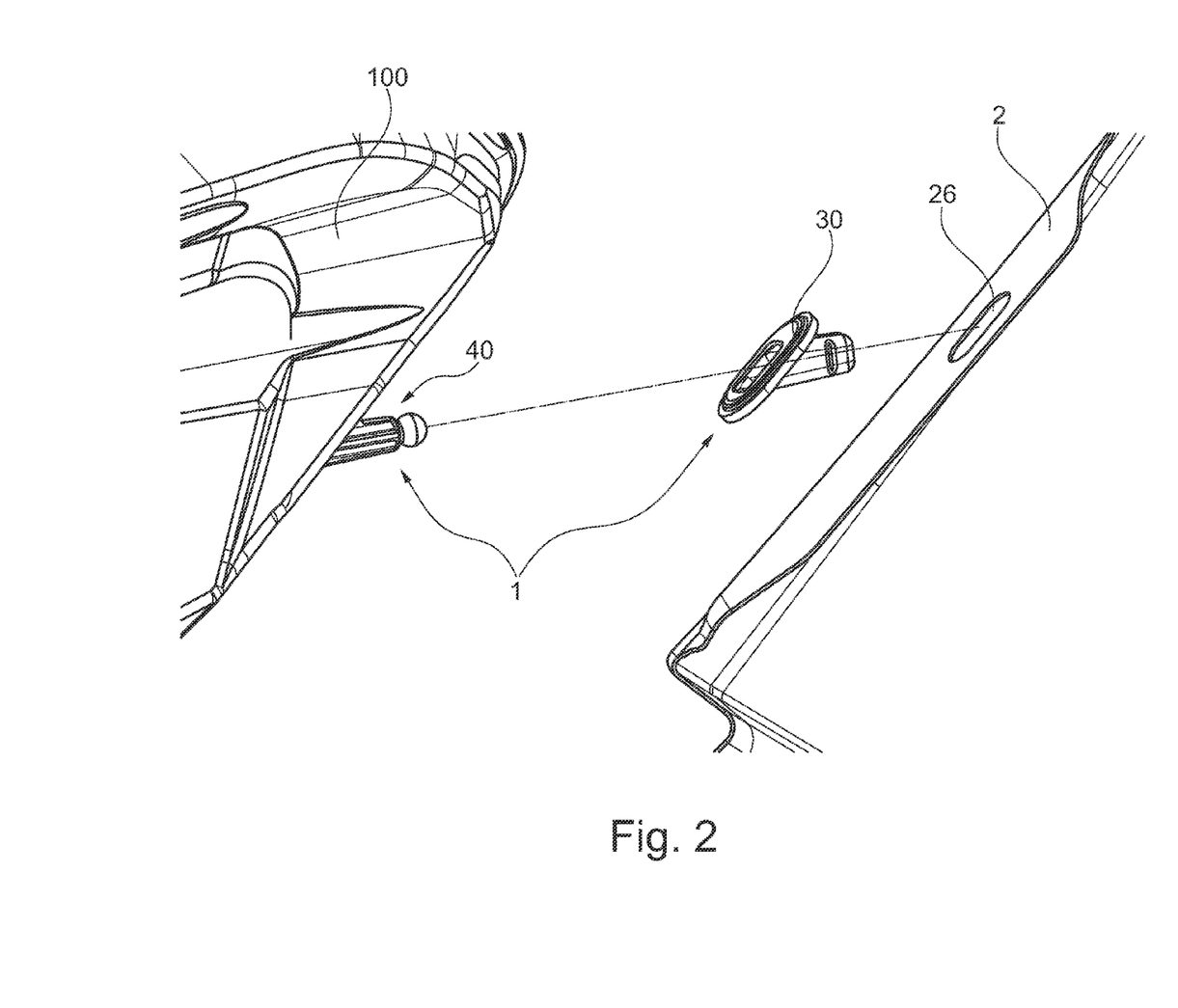
FIG. 2 is an enlarged extract of the detail A of the FIG. 1 with the device according to an embodiment in exploded representation.

FIG. 1 shows a device 1 according to an embodiment that serves for fastening the lamp 100 to the body 2 of the motor vehicle. The lamp 100 can be fixed to the body 2 of the motor vehicle by at least one such device 1, preferentially by a plurality of such devices 1. The device 1 also makes possible connecting the lamp 100 to other bodies in a technically simple manner. FIG. 2 shows the region A of the FIG. 1 in an enlargement. Therein, the device 1 is shown in an exploded representation.

As is evident from FIG. 2, in an embodiment, the device 1 comprises two connecting elements, wherein one connecting element is designed as ball pin 40 and another connecting element as a receiving part 30 receiving the ball pin 40.

Preferably, the ball pin 40 is assigned to the lamp 100 and the receiving part 30 to the body 2. Preferably, the ball pin 40 is molded onto the lamp 100 and preferably projects from the lamp 100 towards the outside, in particular, the ball pin 40 points from the lamp 100 to the front of the vehicle.

In an embodiment, the receiving part 30 is preferably releasably connected to the body 2, for example in that the receiving part 30 is positively and/or non-positively held in a through-opening 26 of the body 2.

Figure 3:
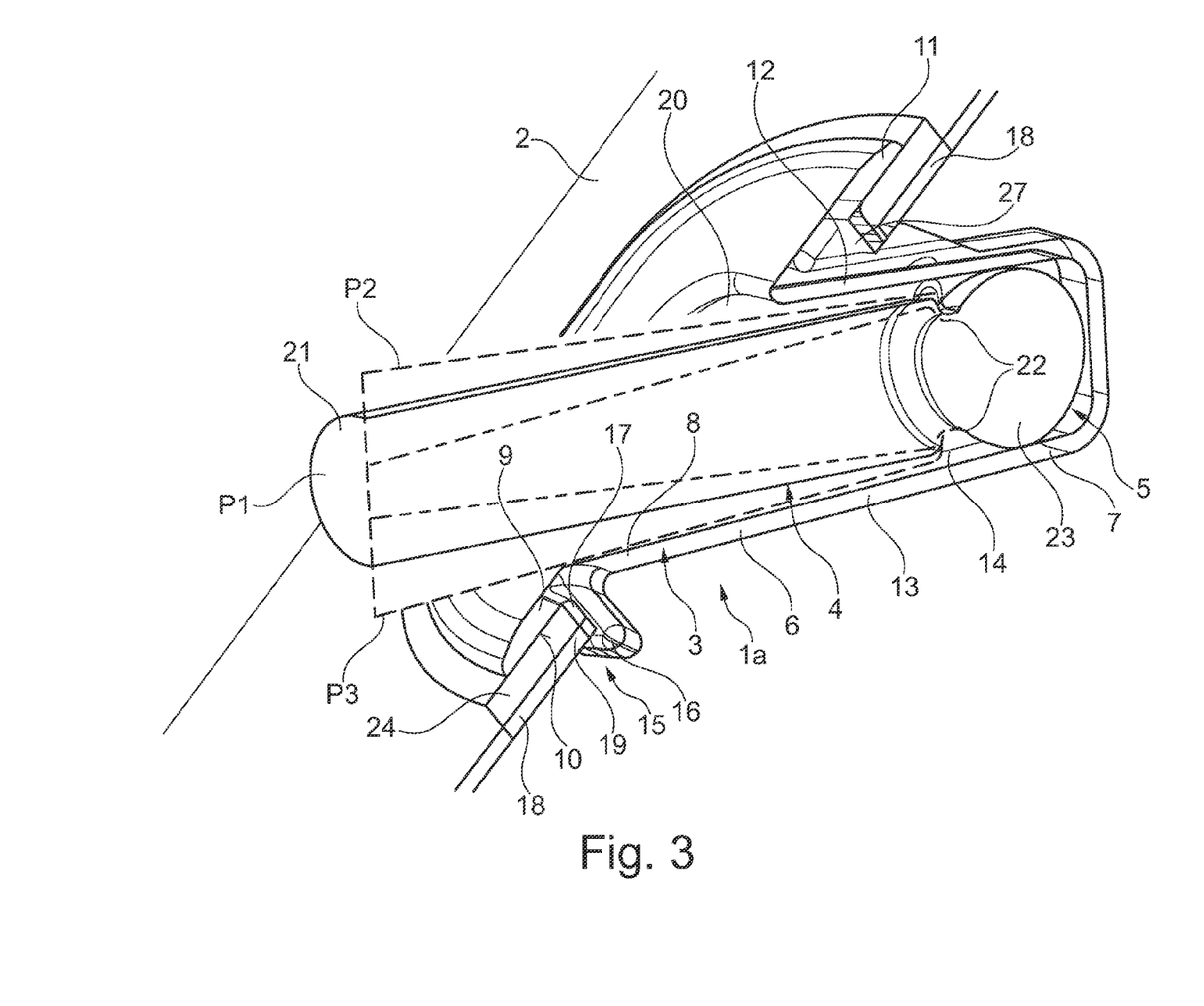
FIG. 3 is sectional representation of the device of FIG. 1 according to an exemplary embodiment.

FIG. 3 shows an embodiment of such a device for fastening a lamp of a motor vehicle to its body, wherein in FIG. 3 the device is provided with the reference number 1a. The device 1a comprises a receiving part 3 that is similar to the receiving part 30 of the device 1 of the FIG. 2, which is assigned to the body 2 of the motor vehicle. Furthermore, the device 1a comprises a ball pin 4 which is similar to the ball pin 40 of the device 1 of the FIG. 2, which is assigned or can be assigned to the lamp 100 (not shown in FIG. 3) according to the FIGS. 1 and 2.

The receiving part 3 comprises a ball socket 5, in which the ball pin 4 with its spherical portion 23 is pivotably received.

Adjoining its spherical portion 23, the ball pin 4 comprises a preferentially rod-shaped portion 21, which is connected to the lamp 100, in particular molded to the lamp. Preferably, the ball pin consists of plastic.

In an embodiment, the rod-shaped portion 23 and the spherical portion 23 are set apart from each other through a constriction 22.

Through the pivotable mounting of the ball pin 4 in the ball socket 5 of the receiving part 3, the ball pin 4 can be pivoted as desired, in particular pivoted in a plurality of planes. Exemplarily, the pivot movement of the ball pin 4 relative to the receiving part 3 in upward and downward direction or in Z-direction of the motor vehicle is shown in FIG. 3, wherein the ball pin can preferably be pivotably moved also to the left and right or in Y-direction of the motor vehicle. The pivot movement in this case is limited through the walls of the receiving part 3. The upper end position P2 and the lower end position P3 of the ball pin 4 are shown in the interrupted lines, in which the ball pin 4 in each case has come to bear against a wall 12 or 13 of the receiving part 3.

The center position P1 of the ball pin 4 in the receiving part 3 is shown in continuous lines, from which for example the ball pin 4 can be moved into the respective end position P2 or P3 or into an intermediate position.

The ball pin 4 can also be pivoted relative to the receiving part 3 transversely to the vertical pivot movement described above.

In an embodiment, the receiving part 3 comprises a tubular portion 6, on the first longitudinal end 7 of which the ball socket 5 is formed and on the second longitudinal end 8 of which a preferentially circumferential collar 9 for bearing against the body 2 is formed. The tubular portion 6 is designed relatively long, so that the ball socket 5 is located with spacing within the body 2.

In an embodiment, the circumferential collar 9 comprises a bearing surface 10 for bearing against a seal 24, which can be inclined against the longitudinal axis or the tubular portion 6. The seal 24 can consists of foam rubber.

In one embodiment, the seal 24 bears against the body 2 of the motor vehicle in the region of the rim 18 of the through-opening 26, thus sealing the through-opening 26 to the outside, wherein in the installed state the receiving part 3 is at least partially inserted into the through-opening 26.

Alternatively, the circumferential collar 9, for example by a molded-on rubber lip, can also bear directly against the rim 18 of the through-opening 26 without seal. In this case, at least one part of the circumferential collar 9 acts as a sealing lip 11 relative to the body 2.

As is further evident from FIG. 3, the ball socket 5 of the receiving part 3 comprises at least two, preferentially more than two, indentations 14 directed to the inside and arranged distributed over the circumference, which engage into a taper of the ball pin 4, thereby fixing the ball pin 4 in its longitudinal direction. Instead of the at least two indentations 14, one indentation can also be provided, which is configured for example circumferential about the outer circumference of the ball pin 4. The indentations 14 are preferentially arranged on the wall 13 of the tubular portion 6, in particular molded thereon.

In an embodiment, the tubular portion 6 is configured rectangularly in cross section with rounded-off corners. However, it can also be configured round or oval in cross section.

In an embodiment, the receiving part 3 is produced from plastic and comprises a sack-like interior, from which the ball pin 4 protrudes through an insertion opening 20. The insertion opening 20 in this case is formed on the side of the receiving part 3 facing away from the ball socket 5.

For fixing the receiving part 3 to the body 2, the receiving part 3 comprises engagement means 15, which operationally engage with the rim 18 of the through-opening 26 subject to the forming of an engagement connection. Preferably, the engagement means 15 comprise at least one lug 16 with an undercut 17, wherein the rim 18 of the through-opening 26 of the body 2 is received between a support surface 19 of the lug 16 and the bearing surface 10 of the collar 9.

In an embodiment, the engagement means 15 are arranged at a location on the circumference of the receiving part 3, for example on the portion of the receiving part 3 which in the installed state on the vehicle body 2 faces downwards. A material portion 27 is provided for example substantially on the opposite side of the receiving part 3, which for example comprises an indentation in which a portion of the rim 18 of the through-opening 26 can be received.

Mounting the receiving part 3 to the body 2 can then be effected in the manner that the receiving part 3 with its tubular portion 6 is first inserted in the through-opening 26 of the body 2 and in the process the material portion 27 receives a portion of the rim 18 of the through-opening 26. In a further step, the receiving part 3 with its engagement means 15 is then brought to bear against the rim 18 of the through-opening 26 and the receiving part 3 fixed against the body 2 through engaging the engagement means 15 relative to the rim 18.

Through the pivotability of the ball pin 4 in the receiving part 3, a position tolerance between the ball pin 4 and the receiving part 3 is achieved, so that a lamp 100 equipped with a plurality of ball pins 4 can be mounted to the respective associated receiving part 3 without problem, even if the respective receiving part 3 on the body 2 slightly varies in its position depending on the configuration of the body 2. Such a position tolerance can be easily offset by the device.

Figure 4:
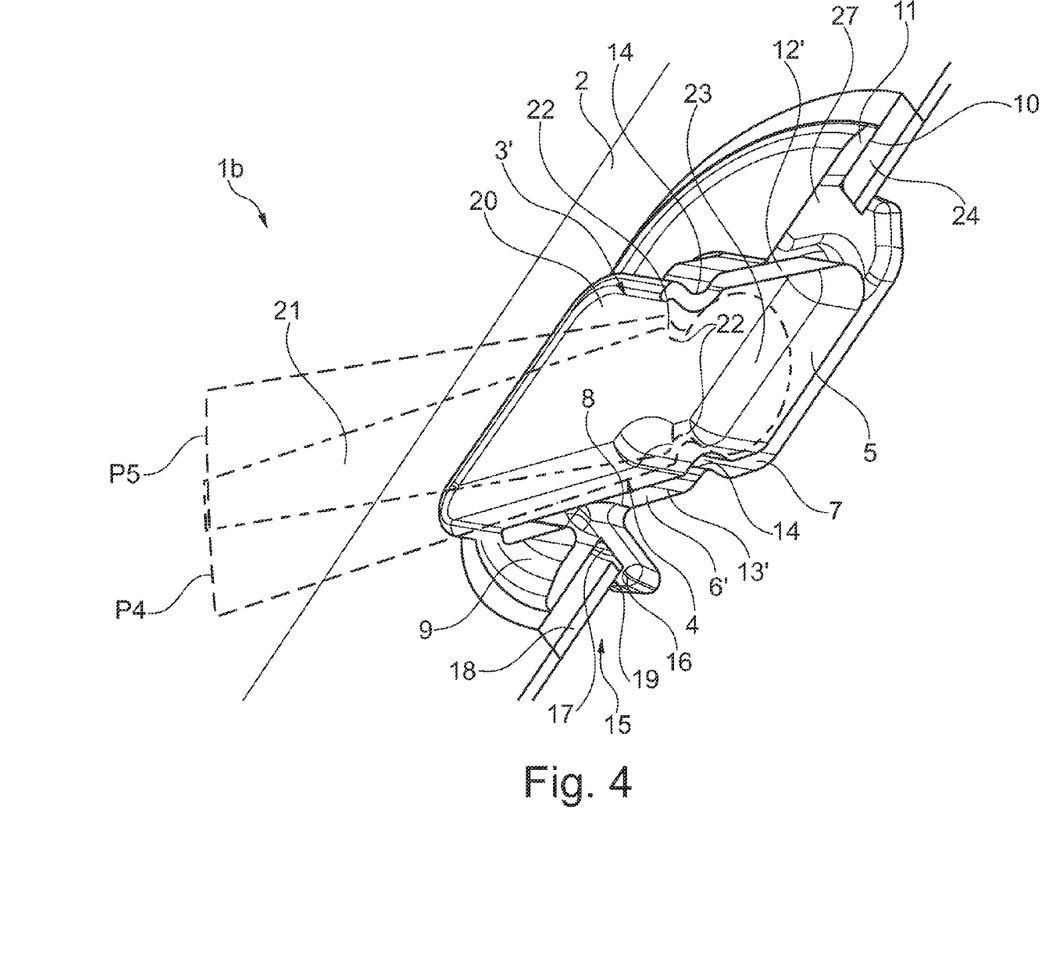
FIG. 4 is sectional representation of the device of FIG. 1 according to another exemplary embodiment.

FIG. 4 shows a further embodiment of the device, which is assigned the reference number 1b.

Components of the device 1a according to FIG. 3, which are identical to or functionally the same as the components of the device 1b according to FIG. 4, are provided with the same reference numbers; insofar, reference is made to the description regarding the device 1a according to FIG. 3 and to the description regarding the FIGS. 1 and 2.

The device 1b according to FIG. 4 differs from the device 1a according to FIG. 3 among other things in the configuration of the receiving part, which in FIG. 4 is provided with the reference number 3'. With the device 1b the ball socket 5 of the receiving part 3' is arranged in the body 2 of the motor vehicle in the region of the wall of the body 2. In an embodiment, the ball socket 5 in the installed state is aligned on the body 2 in the manner that the spherical portion 23 of the ball pin 4 received in the ball socket 5 is substantially aligned with its fulcrum relative to the wall of the body 2. Insofar, the receiving part 3' is designed relatively short and projects into the interior of the body only to a minor extent.

As is evident, furthermore, from FIG. 4, the receiving part 3' has a relatively short tubular portion 6', the one wall 13' of which to the bottom serves as bearing for the ball pin 4 and because of this limits its pivot movement towards the bottom. In an embodiment, the wall 13' in the region of the one longitudinal end 7 forms the indentation 14 for bearing against the constriction 22 of the ball pin 4. On the further wall 12' of the tubular portion 6' the further indentation 14 for bearing against the constriction 22 of the ball pin 4 is formed. The indentation 14 can also be a circumferential indentation, for example if the constriction 22 of the ball pin 4 is circumferential.

In interrupted line, FIG. 4 shows the pivot range of the ball pin 4 towards the top and towards the bottom, wherein the interrupted lines preferentially show the respective end position P4 and P5 of the ball pin 4.

Figure 5:
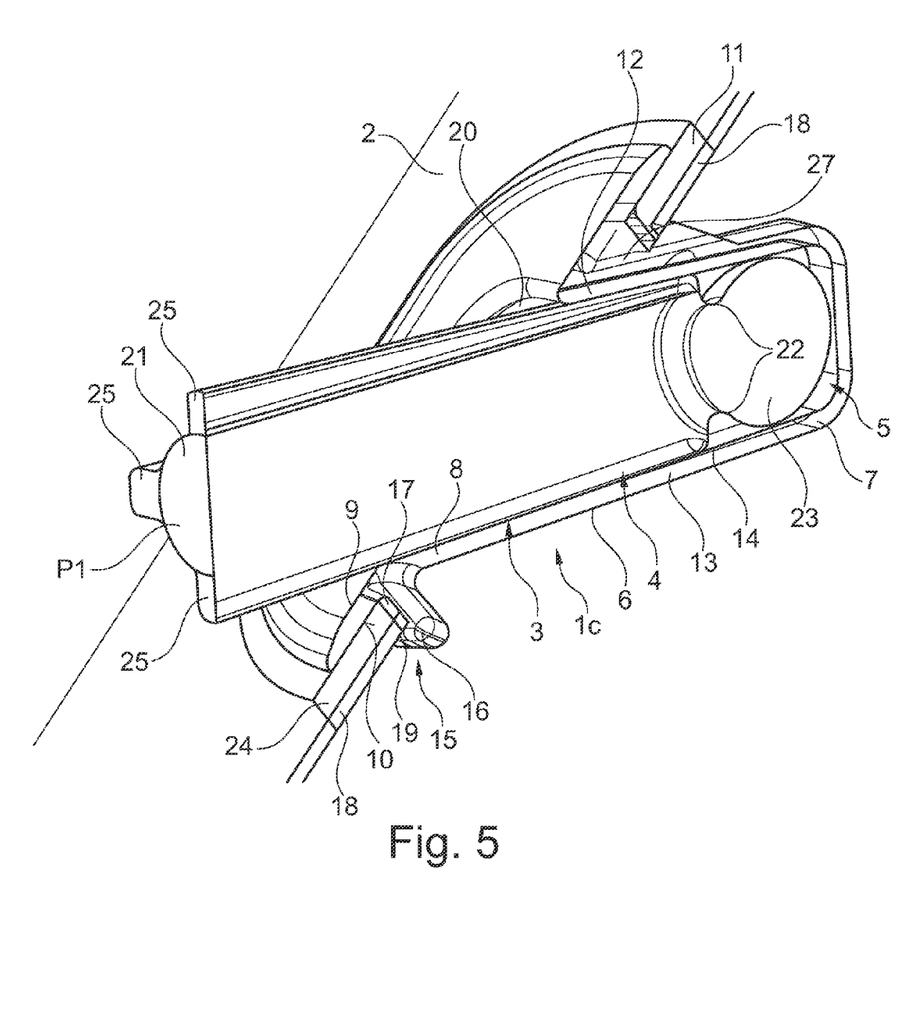
FIG. 5 is a sectional representation of a modification of the embodiment of FIG. 3 in accordance with an exemplary embodiment.

FIG. 5 shows a device 1c according to an embodiment, which with respect to the device 1a according to FIG. 3, is slightly modified. The device 1c according to FIG. 5 differs from the device 1a according to FIG. 3 substantially through at least one, preferentially a plurality of protrusions 25 projecting from the receiving part 3 to the outside, through which the freedom of movement of the ball pin 4 relative to the receiving part 3 is reduced in its pivot range.

In the embodiment according to FIG. 4, the protrusions 25 are distributed over the circumference on the rod-shaped portion 21 of the ball pin 4, for example arranged located opposite one another, so that the ball pin 4 is held substantially immovably in the receiving part 3, i.e. without pivoting freedom.

In an embodiment, the protrusions 25 are designed as webs which substantially extend over the entire length of the rod-shaped portion 21 or at least extend over a portion which can be brought or is brought to bear against a wall of the receiving part 3 or its tubular portion 6.

According to an alternative embodiment, merely two protrusions can be provided for example, which for example are arranged located opposite each other and thus a pivotability in the direction of the protrusions is avoided. In this case, the ball pin 4 can be pivoted to and fro relative to the receiving part 3, however at least in transverse direction thereto.

Figure 6:
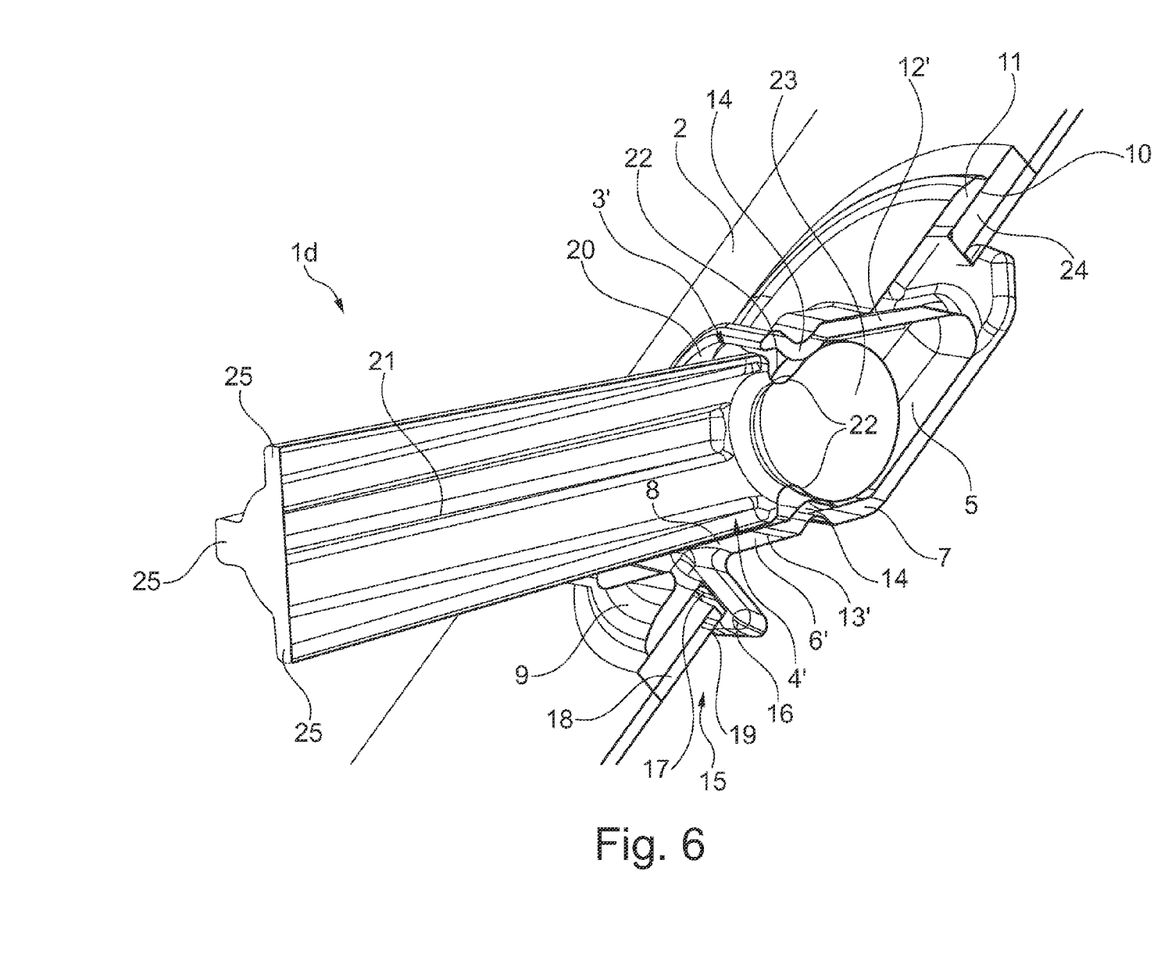
FIG. 6 is a sectional representation of a modification of the embodiment of FIG. 4 in accordance with an exemplary embodiment.

FIG. 6 shows a device 1d, which differs from the device 1b according to FIG. 4 only slightly. With the device 1d according to the FIG. 6—as already with the device 1c according to the FIG. 5—at least one, preferentially a plurality of protrusions projecting outwardly are arranged on the ball pin 4, in particular molded onto the rod-shaped portion 21.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A device for fastening a lamp of a motor vehicle to a body of the motor vehicle, the device comprising:
   a receiving part, comprising: a tubular portion having a first longitudinal end located at an end most portion of the tubular portion and a second longitudinal end, wherein the first longitudinal end is enclosed; a ball socket formed on the first longitudinal end at the end most portion of the tubular portion; and a circumferential collar formed on the second longitudinal end, wherein the circumferential collar is inclined with respect to a longitudinal axis of the tubular portion;
   at least one seal or sealing lip that is separate from and arranged on the circumferential collar for bearing against the body; and
   a ball pin pivotably received in the ball socket, wherein the ball pin is configured as a part of the lamp or as a separate component on the lamp.

2. The device according to claim 1, wherein the ball pin is pivoted in a plurality of planes.

3. The device according to claim 1, wherein the circumferential collar comprises a surface that is inclined at an angle of less than 90 degrees against the longitudinal axis of the tubular portion.

4. The device according to claim 3, wherein the surface of the circumferential collar comprises:
   a bearing surface for the seal or for the sealing lip for bearing against the body, wherein the bearing surface is inclined against the longitudinal axis of the tubular portion at an angle of less than 90 degrees, wherein the seal or for the sealing lip is inclined at an angle of less than 90 degrees against the longitudinal axis of the tubular portion.

5. The device according to claim 4, wherein the tubular portion comprises:
   at least two walls having indentations therein that are pronounced to an inside of the tubular portion.

6. The device according to claim 1, wherein on the receiving part at least one engagement means is arranged, through which the receiving part is fixed to the body.

7. The device according to claim 1, wherein the body comprises:
   a rim that defines a through-opening in the body, and
   wherein the receiving part comprises:
   at least one material portion that is inserted into the through-opening in the body such that the at least one material portion is at least partially engaged with the receiving part to bring the receiving part into a fixed position relative to the through-opening.

8. The device according to claim 1, wherein the receiving part is plastic.

9. The device according to claim 1, wherein the receiving part comprises:
   an insertion opening on a side of the receiving part facing away from the ball socket, wherein the insertion opening opens into a concave interior, wherein the concave interior is sack-like, and
   wherein the ball pin protrudes through the insertion opening into the concave interior.

10. The device according to claim 1, wherein the ball pin comprises:
    a spherical portion; and
    a rod-shaped portion that is spaced apart from the spherical portion by a constriction formed between the spherical portion and the rod-shaped portion.

11. The device according to claim 10, wherein the spherical portion is a three-dimensional and has a center, wherein all points on the surface of the spherical portion are a same distance from the center.

12. The device according to claim 1, wherein the at least one seal or sealing lip is not part of the circumferential collar, and wherein the at least one seal or sealing lip is a separate element from the circumferential collar.

13. The device according to claim 12, wherein the circumferential collar is inclined at an angle greater than zero degrees and less than 90 degrees with respect to a longitudinal axis of the tubular portion, and wherein the circumferential collar comprises a surface that is inclined against the longitudinal axis of the tubular portion.

14. The device according to claim 13, wherein the surface of the circumferential collar comprises:
    a bearing surface for the seal or for the sealing lip for bearing against the body, wherein the bearing surface is inclined at an angle greater than zero degrees and less than 90 degrees against the longitudinal axis of the tubular portion.

15. The device according to claim 1, wherein the first longitudinal end is located at a first extremity of the tubular portion, wherein the second longitudinal end is located at a second extremity of the tubular portion, wherein the ball socket is formed on the first longitudinal end at the first extremity of the tubular portion, and wherein the tubular portion further comprises:
    a tube portion between the first longitudinal end and the second longitudinal end.

16. The device according to claim 1, wherein the body comprises:
    a rim that defines a through-opening in the body, and
    wherein the receiving part comprises:
    engagement means arranged at a location on a circumference of the receiving part, wherein the engagement means is configured to engage with the rim to form an engagement connection that fixes the receiving part to the body; and
    at least one material portion that is inserted into the through-opening in the body such that the at least one material portion is at least partially engaged with the receiving part to bring the receiving part into a fixed position relative to the through-opening.

17. The device according to claim 16, wherein the circumferential collar comprises a surface, and wherein the engagement means, comprises:
    at least one lug comprising a support surface and an undercut, wherein the rim of the body is received between the support surface of the lug and the surface of the circumferential collar.

18. A lamp for a motor vehicle, wherein the lamp is connected to the motor vehicle by a device comprising:
    a receiving part, comprising: a tubular portion having a first longitudinal end located at an end most portion of the tubular portion and a second longitudinal end, wherein the first longitudinal end is enclosed; a ball socket formed on the first longitudinal end at the end most portion of the tubular portion; and a circumferential collar formed on the second longitudinal end, wherein the circumferential collar is inclined with respect to a longitudinal axis of the tubular portion;
    at least one seal or sealing lip that is separate from and arranged on the circumferential collar for bearing against a body of the motor vehicle; and a ball pin pivotaly received in the ball socket, wherein the ball pin is configured as a part of the lamp or as a separate component on the lamp.

19. The lamp according to claim 18, wherein the lamp is a tail lamp.

* * * * *